United States Patent [19]
Chu et al.

[11] Patent Number: 5,778,082
[45] Date of Patent: Jul. 7, 1998

[54] METHOD AND APPARATUS FOR LOCALIZATION OF AN ACOUSTIC SOURCE

[75] Inventors: Peter L. Chu, Lexington; Hong Wang, Westford, both of Mass.

[73] Assignee: PictureTel Corporation, Andover, Mass.

[21] Appl. No.: 663,670

[22] Filed: Jun. 14, 1996

[51] Int. Cl.$^6$ .................................................. H04N 7/15
[52] U.S. Cl. ........................................ 381/92; 348/15
[58] Field of Search ............................. 348/15; 387/92, 387/94; H04N 7/15

[56] References Cited

U.S. PATENT DOCUMENTS

| | | | |
|---|---|---|---|
| 4,581,758 | 4/1986 | Coker et al. | |
| 4,741,038 | 4/1988 | Elko et al. | 381/92 |
| 4,965,819 | 10/1990 | Kannes | 379/53 |
| 4,980,761 | 12/1990 | Natori | 379/205 |
| 5,058,419 | 10/1991 | Nordstrom et al. | |
| 5,206,721 | 4/1993 | Ashida et al. | 379/202 |
| 5,335,011 | 8/1994 | Addeo et al. | |
| 5,465,302 | 11/1995 | Lazzari et al. | 381/92 |
| 5,550,924 | 8/1996 | Helf et al. | 381/94 |

FOREIGN PATENT DOCUMENTS

| | | | |
|---|---|---|---|
| 0 594 098 A1 | 4/1994 | European Pat. Off. | |
| 4-109784 | 4/1992 | Japan | H04N 7/15 |

OTHER PUBLICATIONS

M. Omologo and P. Svaizer, "Acoustic Event Localization Using A Crosspower-Spectrum Phase Based Technique," Proceedings of the 1994 International Conference on Acoustics, Speech, and Signal Processing, Apr. 1994, Adelaide, South Australia, pp. II–273 to II–276.

*Primary Examiner*—Forester W. Isen
*Attorney, Agent, or Firm*—Fish & Richardson P.C.

[57] ABSTRACT

An acoustic signal processing method and system using a pair of spatially separated microphones to obtain the direction or location of speech or other acoustic signals from a common sound source is disclosed. The invention includes a method and apparatus for processing the acoustic signals by determining whether signals acquired during a particular time frame represent the onset or beginning of a sequence of acoustic signals from the sound source, identifying acoustic received signals representative of the sequence of signals, and determining the direction of the source based upon the acoustic received signals. The invention has applications to videoconferencing where it may be desirable to automatically adjust a video camera, such as by aiming the camera in the direction of a person who has begun to speak.

37 Claims, 8 Drawing Sheets

METHOD AND APPARATUS FOR LOCALIZATION OF AN ACOUSTIC SOURCE

BACKGROUND OF THE INVENTION

The present invention relates generally to acoustic signal processing and, more particularly, to a method and apparatus for identifying the direction and/or location of an acoustic source.

Some known audio communication systems incorporate one or more microphones for acquiring acoustic signals. In certain situations, however, the direction of a sound source is variable or unpredictable. For example, in conferencing arrangements in which multiple speakers in a room use a speakerphone set, the direction of sound may be variable because different persons may speak from different locations in the conference room. In addition, speakers may move about while speaking. Nevertheless, in contexts such as videoconferencing, it is desirable to identify the direction or position of the speaker.

SUMMARY OF THE INVENTION

The present invention is directed to an acoustic signal processing method and system using pairs of spatially separated microphones to obtain the direction of speech or other acoustic signals from a common sound source. The invention includes a method and apparatus for processing the acoustic signals by determining whether signals acquired during a particular time frame represent the onset or beginning of a sequence of acoustic signals from the sound source, identifying acoustic received signals representative of the sequence of signals when the data represents the beginning of the sequence, and determining the direction of the source based upon the acoustic received signals.

In a presently preferred embodiment, the onset or beginning of a sequence of acoustic signals from the source is preferably detected on a frequency-by-frequency basis. Preferably, data associated with those frequency components of acquired signals which satisfy the following two conditions are deemed to be representative of signals occurring at the onset of a sequence of acoustic signals from the source. First, the magnitude of the frequency component should preferably be greater than the background noise energy for that frequency by at least a predetermined amount. Second, the magnitude of the frequency component should preferably be greater, by at least a predetermined amount, than the magnitude of corresponding frequency components acquired during a predetermined number of preceding time frames.

If the two conditions are met for a particular frequency during a particular time frame, then it is assumed that an onset condition is met with respect to that frequency. A cross-correlation for the acoustic signals acquired by the pair of microphones during the time frame is generated with respect to each such frequency component, and a cross-correlation for the noise at each such frequency is subtracted to identify the acoustic received signals representative of the sequence of signals from the acoustic source. Preferably, the acoustic received signals are accumulated during a predetermined length of time. If at the end of the predetermined time period, non-zero values for at least a specified number of frequencies have been accumulated, then the accumulated values are used to determine the time delay between signals arriving at the pair of microphones from the common source. This information may then be used to determine the direction or bearing angle of the acoustic source with respect to the microphones. Arrays of microphones may advantageously be used in place of a single pair of microphones to enhance the system's capability.

The invention is particularly suitable for use in applications such as videoconferencing, video recording and broadcasting, where it may be desirable to automatically aim a video camera within a set of cameras, such as by panning, tilting or switching the active camera in the direction of a person or group of people which has begun to speak.

Other features and advantages of the present invention will be more clearly understood upon reading the following detailed description and accompanying drawings.

DESCRIPTION OF THE PREFERRED EMBODIMENTS

Figure 1:
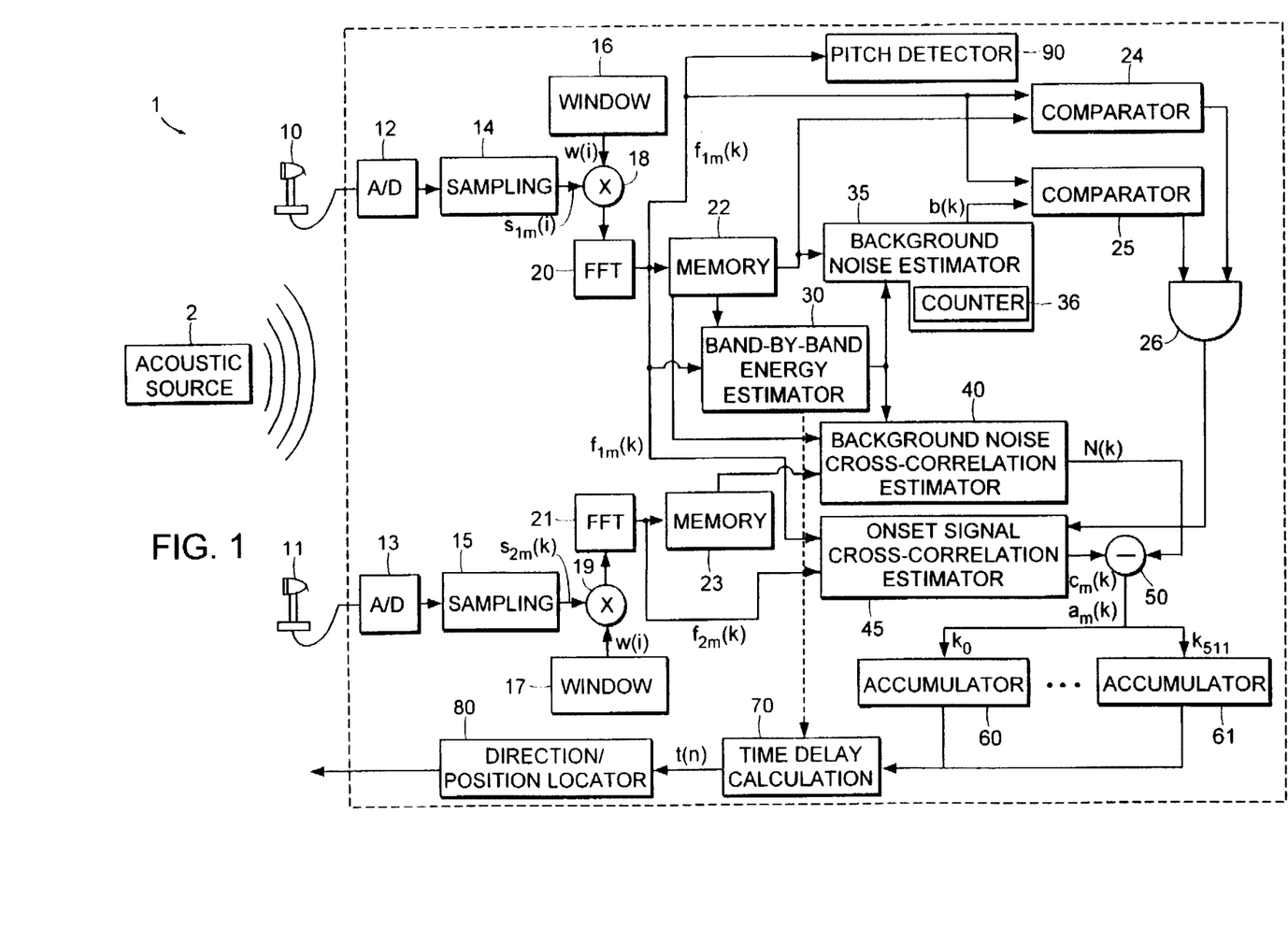
FIG. 1 is a functional block diagram illustrating an exemplary system for locating the direction of an acoustic source according to the invention.

FIG. 1 is a functional block diagram illustrating an exemplary system 1 for locating the direction of an acoustic source according to the invention. The system 1 may be used, for example, to determine the direction of an acoustic source 2, such as a person speaking in a reverberant environment. The invention is, thus, particularly suitable for applications in the context of videoconferencing where it may be desired, for example, to aim a video camera in the direction of the person speaking. It should be understood, however, that the invention is applicable to other contexts as well, such as general video directing in recording and broadcasting.

The various functional modules of FIG. 1 may be implemented, for example, by an appropriately programmed processor such as a microprocessor having suitable memories such as read only memory (ROM), random access memory (RAM) and/or other forms of memory. Alternative suitable processors for performing the functions of the modules of FIG. 1 include minicomputers, microcontrollers, programmable logic arrays and application specific integrated circuits. The programming and use of such processors is well known in the art and is, therefore, not further described herein.

Figure 2A:
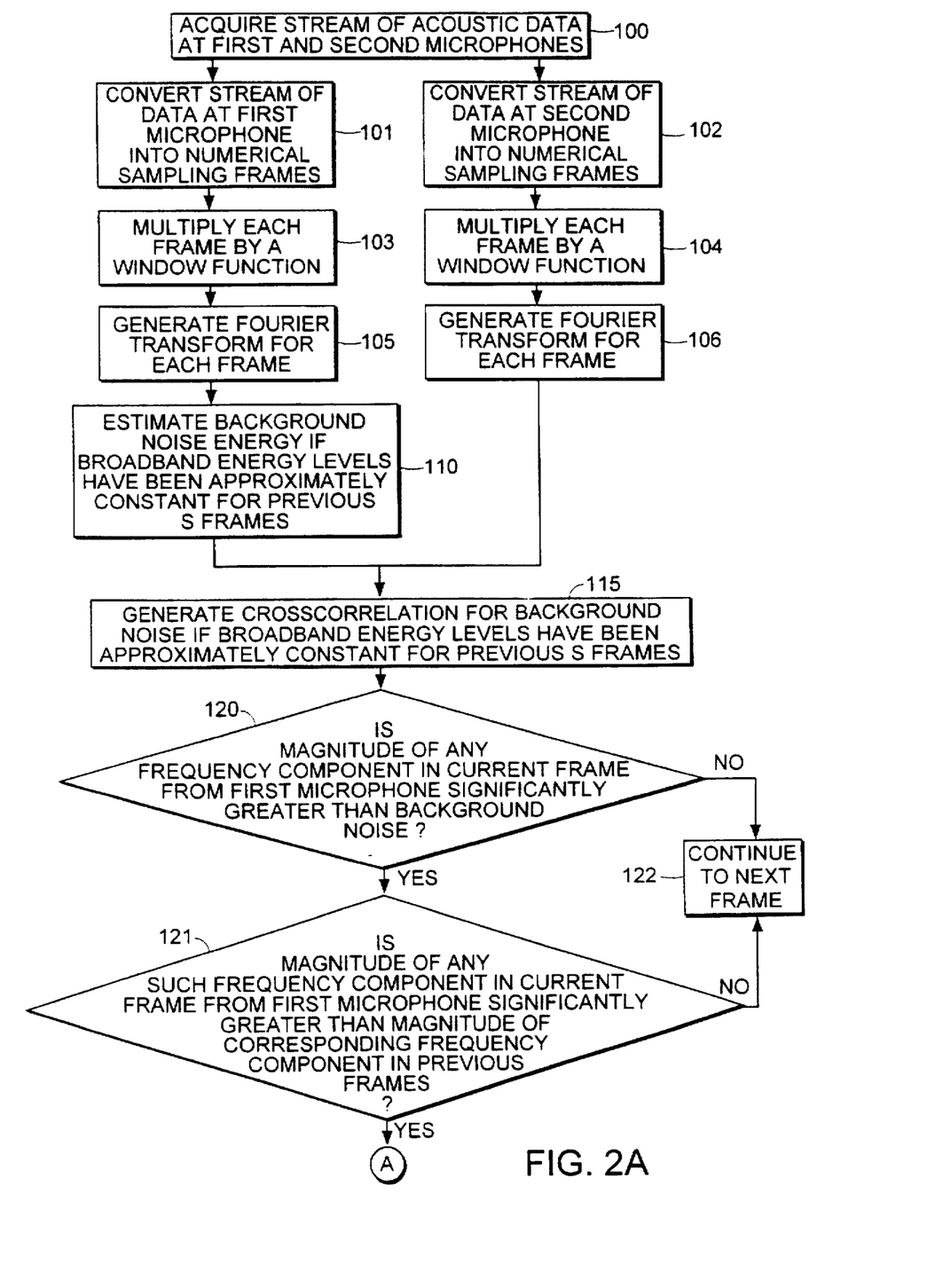
FIGS. 2A–2B are a flow chart showing the steps of the method of the invention.
Figure 2B:
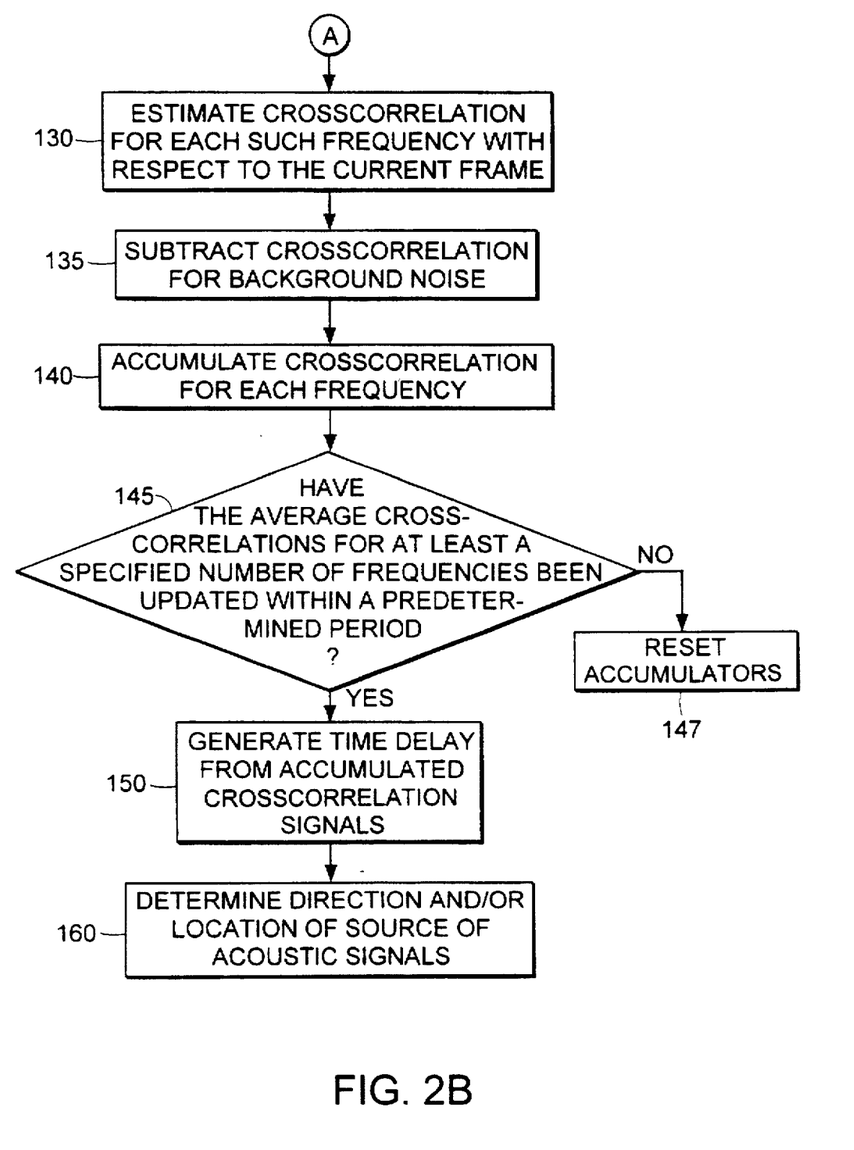

FIG. 1 may be best understood in conjunction with FIGS. 2A–2B. As indicated by step 100, streams of acoustic data are acquired by two or more transducers, such as the pair of microphones 10, 11 spatially separated by a distance D. The streams of acoustic data may include a sequence of acoustic signals received directly from the source 2, as well as noise and reverberant signals. The signals received in the pair of microphones 10, 11 are fed to respective sampling modules 14, 15 through analog-to-digital (A/D) converters 12, 13 operating at a sampling frequency of 16 kHz, for example. The sampling modules 14, 15 convert the respective streams of data received from the microphones 10, 11 into numerical sampling frames of N samples, as indicated by steps 101, 102, respectively. The number of samples N may be, for example, 512. The blocks of N samples may overlap, and typically overlap by N/2 samples. Respective multipliers 18, 19 multiply the output signals from the sampling modules 14, 15 by window functions generated by modules 16, 17, as indicated by steps 103, 104. The window function modules 16, 17 generate, for example, a conventional Hamming window. In a presently preferred embodiment, however, the window function modules 16, 17 use an exponential window function, such as $$w(i) = \sqrt{i} \, \exp[-(i^2/80N)], \, i=0,\ldots,N-1. \qquad [1]$$

Other window functions also may be used. The signals appearing at the output of the multipliers 18, 19 have the form $$x_{1m} = w(i)s_{1m}(i), \, i=0,\ldots,N-1$$
$$x_{2m} = w(i)s_{2m}(i), \, i=0,\ldots,N-1 \qquad [2]$$

where $s_{1m}(i)$ and $s_{2m}(i)$ represent the signals received from the microphones 10, 11, respectively, during frame m.

Next, as indicated by steps 105, 106 in FIG. 2A, the signals at the output of the multipliers 18, 19 are processed by respective modules 20, 21 which perform an integral transform, such as the Fast Fourier Transform (FFT), for each frame. The Fourier transformed signals, $f_{1m}(k), f_{2m}(k)$, represent the calculations $$f_{1m}(k) = \sum_{n=0}^{N-1} x_{1m}(n)\exp(-2\pi jkn/N) \qquad [3]$$

$$f_{2m}(k) = \sum_{n=0}^{N-1} x_{2m}(n)\exp(-2\pi jkn/N)$$

where j is the square root of −1. The values of k may range, for example, from 125 Hz to 7.5 kHz, although other ranges of k are also possible. The Fourier transformed signals are stored, for subsequent processing, in respective memories 22, 23 associated with each FFT module 20, 21. The Fourier transformed signals of the current frame may also be sent directly to other modules for further processing. For example, the Fourier transformed signals may be sent to a pitch detector 90, such as the pitch detector described in U.S. application Ser. No. 08/434,798, which is incorporated herein by reference.

In accordance with the principles of the invention, a stationary background noise energy is estimated separately for each frequency component of the signals received from one of the microphones, for example, the microphone 10. As indicated by step 110, the background noise energy is estimated by a background noise estimator 35. The noise estimator 35 uses the Fourier transformed signals of the previous S frames to estimate the background noise if it is determined that the signals in the previous S frames are noise only and that there is an approximately constant level of noise. The number of frames, S, may suitably be, for example, one hundred.

Figure 3:
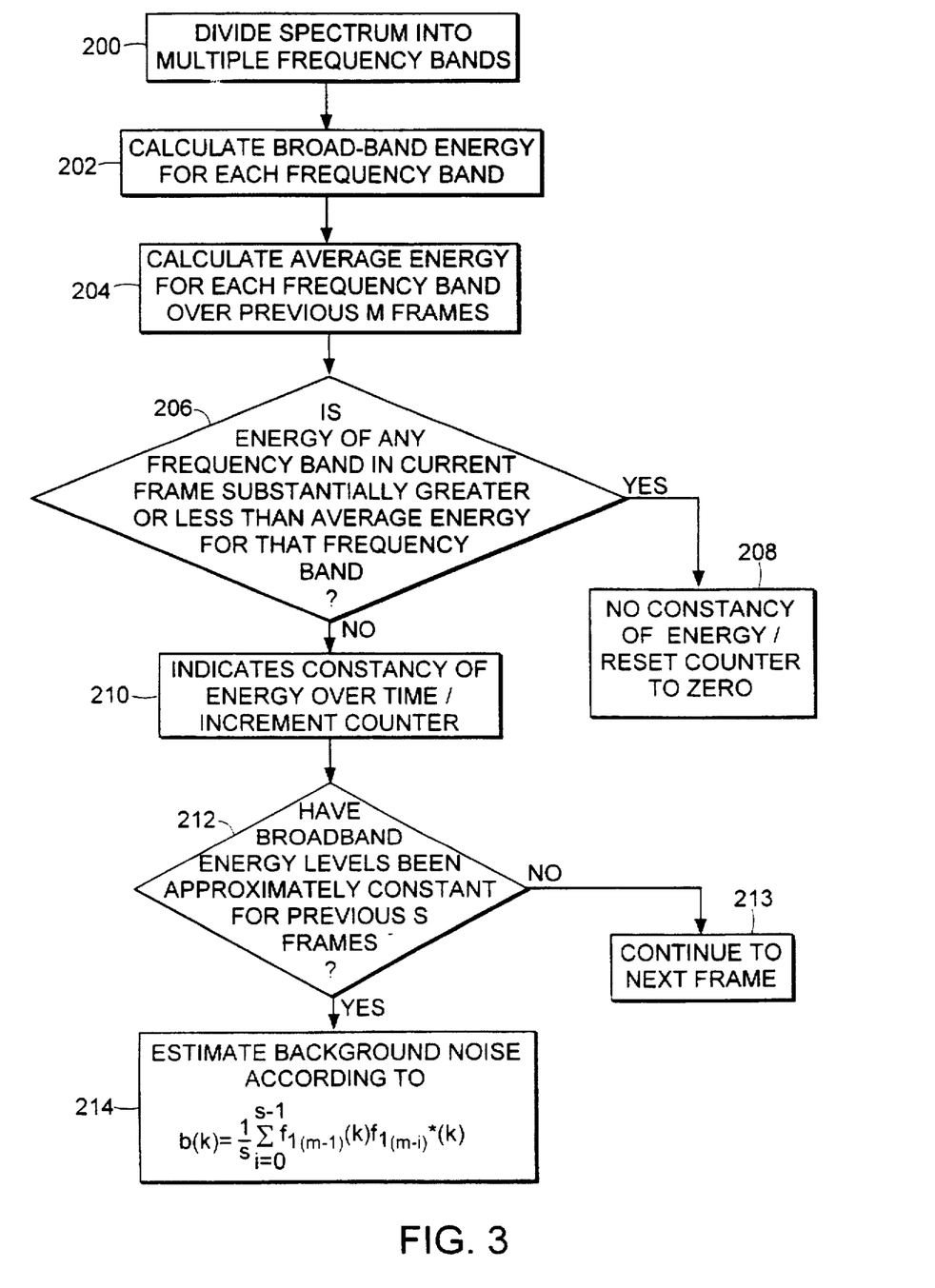
FIG. 3 is a flow chart of one technique for estimating background noise.

FIG. 3 is a flow chart showing the steps of one technique for estimating the background noise. As indicated by step 200 in FIG. 3, the relevant frequency spectrum is divided into L, preferably non-overlapping, frequency bands. For example, eight frequency bands, each having a 1 kHz bandwidth, may suitably be used. Next, as indicated by step 202, a band-by-band energy estimator 30 generates a broad-band energy signal for each frequency band from the Fourier components for the current frame. Thus, for example, assuming thirty-two coefficients for each 1 kHz band, the average energy for each band is calculated according to $$b_m(r) = \sum_{k=32r}^{32r+31} |f_{1m}(k)|^2, \, r=0,\ldots,L-1. \qquad [4]$$

where $b_m(r)$ is the broad-band energy for frequency band r and frame number m.

Next, as indicated by step 204, an average broad-band energy signal for each frequency band is generated from the broad-band energies of the previous M frames. Thus, the average energy for a particular frequency band r is preferably calculated according to $$c(r) = \frac{1}{M} \sum_{m=m'-M+1}^{m'} b_m(r) \qquad [5]$$

where M may be set, for example, to four, and where m' is the current frame number. A determination is then made as to whether the energy in each frequency band has remained relatively constant with respect to previous frames. In particular, a determination is made as to whether any frequency band in the current frame is greater than the average energy for that frequency band by at least a predetermined amount, as indicated by 206. A determination is also made as to whether any frequency band is less than the average energy for that frequency band by at least a predetermined amount. In other words, the band-by-band energy estimator 30 determines whether $$b_m(r) \overset{?}{>} T_b c(r), \, r=0,\ldots,L-1 \qquad [6]$$

$$c(r) \overset{?}{>} T_b b_m(r), \, r=0,\ldots,L-1$$

where $T_b$ may be set, for example, to five. Higher or lower values of $T_b$ may be used depending upon the particular application. If either determination in equations [6] is affirmative with respect to one or more frequency bands, then the energy estimator 30 generates an output signal indicating that there is no constancy of energy over time as indicated by step 208. A counter 36 in the background noise estimator 35 which keeps track of the number of consecutive frames for which the broadband energy levels have been approximately constant is reset to zero. Otherwise, an output signal is provided to indicate that the broadband energy levels in the current frame are approximately constant with respect to previous frames, as indicated by step 210, and the counter 36 is incremented by one.

Alternative measures of constancy of energy over time may be used in place of steps 204, 206. For example, one alternative is to determine whether $$b_m(r) \overset{?}{>} T_b B_{m'-M}(r) \qquad [7]$$

$$b_{m'-M}(r) \overset{?}{>} T_b B_m(r)$$

where M again might be, for example, four.

In any event, the background noise estimator 35, determines whether the broadband energy levels have been approximately constant for the previous S frames, as indicated by 212. This may be accomplished by checking whether the counter 36 is equal to at least S. If the broadband energy levels of the previous S frames have not been approximately constant, then the system 1 continues to process the next frame, as indicated by step 213. If, however, the determination 212 is affirmative, then the background noise estimator 35 preferably calculates the background noise according to $$b(k) = \frac{1}{S} \sum_{i=0}^{S-1} f_{1(m-i)}(k) f_{1(m-i)}^*(k) \quad [8]$$

as indicated by step 214, where $f_{1(m-i)}^*$ is the complex conjugate of $f_{1(m-i)}$ and where S may be equal, for example, to one hundred. For this purpose, the frequency components of the Fourier transformed signals for the previous frames are sent from the memory 22 to the background noise estimator 35. Output signals, generated by the noise estimator 35 and representing the background noise, are used, as described further below, to decide which frequency components of the current frame are to be considered useful data in calculating the direction and/or location of the source 2.

The signals generated by the energy estimator 30 are also sent to a background noise cross-correlation estimator 40. If it is determined that the broadband energy levels of the previous S frames have been approximately constant, then a cross-correlation signal for the signals of the previous S frames is generated by the noise cross-correlation estimator 40, as indicated by step 115. The background noise cross-correlation is preferably calculated according to $$N(k) = \frac{1}{S} \sum_{i=0}^{S-1} f_{1(m-i)}(k) f_{2(m-i)}^*(k) \quad [9]$$

where $f_{2(m-i)}^*$ is the complex conjugate of $f_{2(m-i)}$, and $N(k)$ represents the cross-correlation for the noise at a particular frequency k. For this purpose, the frequency components of the Fourier transformed signals for the previous S frames are sent from the respective memories 22, 23 to the background noise cross-correlation estimator 40. Output signals, generated by the noise cross-correlation estimator 40 and representing the cross-correlation for the noise, are used, as described further below, to assist in identifying the cross-correlation for acoustic received signals which the system 1 determines to have originated from the source 2.

In the presently preferred embodiment of the invention, a frequency component of acoustic data acquired at the microphones 10, 11 is considered useful in determining the direction of the source 2 if two conditions are met with respect to the particular frequency component of the present frame, as further explained below. First, as indicated by 120 in FIG. 2A, a comparator 25 determines, with respect to signals received from the microphone 10, which frequency components of the current frame, if any, have a magnitude which is greater than the magnitude of the background noise b(k) for the corresponding frequency component by at least a predetermined amount. Second, as indicated by 121, a comparator 24 determines which frequency components of the current frame, if any, have a magnitude which is greater by at least a predetermined amount than the magnitude of the corresponding frequency components in the previous p frames, where p may be set, for example, to four. Mathematically, the first condition may be expressed as $$f_{1m}(k) \overset{?}{>} T_N b_m(k) \quad [10]$$

where $T_N$ may be set, for example, to four. The second condition may be expressed as $$f_{1m}(k) \overset{?}{>} T_o f_{1(m-i)}(k), i = 1, \ldots, p \quad [11]$$

where $T_o$ may be set, for example, to four. Higher or lower values of $T_N$ and $T_o$ may be used depending upon the particular application. Similarly, pre-specified values of p other than four may be used. Whereas the first condition serves to indicate that a signal from the acoustic source 2 is present, the second condition serves to indicate the onset or beginning of a sequence of acoustic signals received from the source 2. If no frequency components satisfy both the conditions expressed by equations [10] and [11], then the system continues to process the next frame of acoustic data, as indicated by step 122.

When both of the aforementioned conditions expressed by equations [10] and [11] are satisfied with respect to a particular frequency k, a two input AND gate 26 generates a signal indicating that both conditions are satisfied for the frequency k of the present frame. Signals generated by the AND gate 26 are then routed to an onset signal cross-correlation estimator 45. In response to the signal from the AND gate 26, the cross-correlation estimator 45 calculates and generates a cross-correlation signal for the particular frequency k according to $$c_m(k) = f_{1m}(k) f_{2m}^*(k) \quad [12]$$

as indicated by step 130. For this purpose, the cross-correlation estimator 45 receives the respective frequency component signals from the FFT modules 20, 21. Next, as indicated by step 135, a differencer 50 subtracts the background noise cross-correlation N(k), generated in step 115, from the cross-correlation $c_m(k)$ generated in step 130. Thus, output signals $a_m(k)$ for frequency k in frame m are generated by the differencer 50 according to $$a_m(k) = c_m(k) - N(k) \quad [13]$$

The output signals obtained from step 135 represent the acoustic received signals corresponding to the beginning or onset of the sequence of acoustic signals received from the source 2.

The signals generated by the differencer 50 are forwarded to a corresponding one of a plurality of accumulators 60, . . . , 61, each of which corresponds to one of the frequencies k, 4 through 240. As indicated by step 140, each respective accumulator 60, . . . , 61 adds the results, which were obtained from the differencer 50 and which correspond to its particular frequency, to previous results stored in the accumulator 60, . . . , 61 for a specified period of time. Thus, $$a_{m,new}(k) = a_{m,old}(k) + [c_m(k) - N(k)] \quad [14]$$

where $a_{m,old}(k)$ represents the previous value stored in the cross-correlation accumulator for the frequency k, and $a_{m,new}(k)$ represents the new value stored in the cross-correlation accumulator for the frequency k.

At the end of the specified period of time, for example, two seconds, a determination is made as to whether more than a predetermined number of cross-correlation accumulators 60, . . . , 61 have non-zero entries, as indicated by 145. If at least the specified number of accumulators 60, . . . , 61 do not have non-zero entries and, therefore, have not been updated, then the values of the accumulators 60, . . . , 61 are reset to zero, as indicated by step 147. If, on the other hand, the determination 145 is affirmative, then, as indicated by step 150, a signal representing the time delay t(n) between the time of arrival of the acoustic signals at the microphones 10, 11 is generated. The time delay is generated from the accumulated cross-correlation signals by a time delay calculation module 70.

In a presently preferred embodiment, the module 70 also receives a signal from the band-by-band energy estimator 30 to confirm that the current frame includes a sequence of signals from the acoustic source 2. According to this embodiment, only if the signal received from the band-by-band energy estimator 30 also indicates that the current frame includes a sequence of signals from the source 2 would the module 70 generate the time delay signal t(n).

To generate the time delay t(n), the module 70 preferably normalizes the magnitudes of the cross-correlation values currently stored in the accumulators 60, . . . , 61. Thus, for each frequency accumulator 60, . . . , 61 whose entry is non-zero, the magnitude is preferably set to one. For each frequency accumulator 60, . . . , 61 whose entry is zero, or, in other words, which was not updated, the magnitude is set to zero. Mathematically, $$a'_{m,new}(k) = \frac{a_{m,new}(k)}{|a_{m,new}(k)|} \text{ for } a_{m,new}(k) \neq 0. \quad [15]$$

Based upon the normalized values of the accumulated cross-correlation values, the module 70 then generates a signal indicative of the time delay for the acoustic signals arriving at the pair of microphones 10, 11 during the frame m.

In one embodiment, the module 70 calculates and generates a signal representative of the inverse Fourier transform according to $$t(n) = \frac{1}{N} \sum_{k=0}^{N-1} a'_{m,new}(k) \exp[2\pi j k n/N] \quad [16]$$

which generates a value corresponding to the value of the delay for the acoustic signals arriving at the pair of microphones 10, 11 during the frame m. Thus, for example, the maximum value of t(n) is selected as the delay. Alternatively, interpolation may be used to measure delays of fractions of a sample according to $$t(n') = \frac{1}{N} \sum_{k=0}^{N-1} a'_{m,new}(k) \exp[2\pi j k n'/lN] \quad [17]$$

where I is an integer by which the time resolution of the cross-correlation is increased. Thus, for example, the maximum value of t(n') is selected as the delay. In yet a further embodiment, zero value samples may be inserted between the actual sample values of the inverse transform sequence. The resulting sequence would then be filtered using a lowpass filter to obtain the value of the time delay.

In alternative embodiments, the time delay between the signals arriving at the pair of microphones 10, 11 may be estimated by the module 70 using a histogramming approach such as the one described in U.S. Pat. No. 5,058,419, which is incorporated herein by reference. Thus, for example, phase differences between the signals arriving at the two microphones 10, 11 are measured for multiple frequencies in the manner described above using the cross-correlation values stored in the accumulators 60, . . . , 61. Each measured phase difference provides a potential time delay. The average of potential time delays falling within a time delay range which has the greatest number of occurrences is selected as the actual time delay.

In situations where a reflected path of the acoustic signals arriving from the source 2 is likely to be stronger than the direct path, the histogramming approach described above may be modified by giving a preference to large positive peaks with values close to a time delay of zero. Peaks closer to a time delay of zero are more likely to correspond to the direct path. Thus, for example, each range of time delays may be assigned a weight to bias the selection of the actual time delay in favor of the average time delay resulting from the range which has a large number of occurrences and which is also relatively close to zero. In general, ranges of time delays having smaller magnitudes are assigned higher relative weights than ranges of time delays having larger magnitudes, although the relative weights may be assigned in any manner that takes account of previously known information to bias the selection of the time delay as desired.

Figure 4:
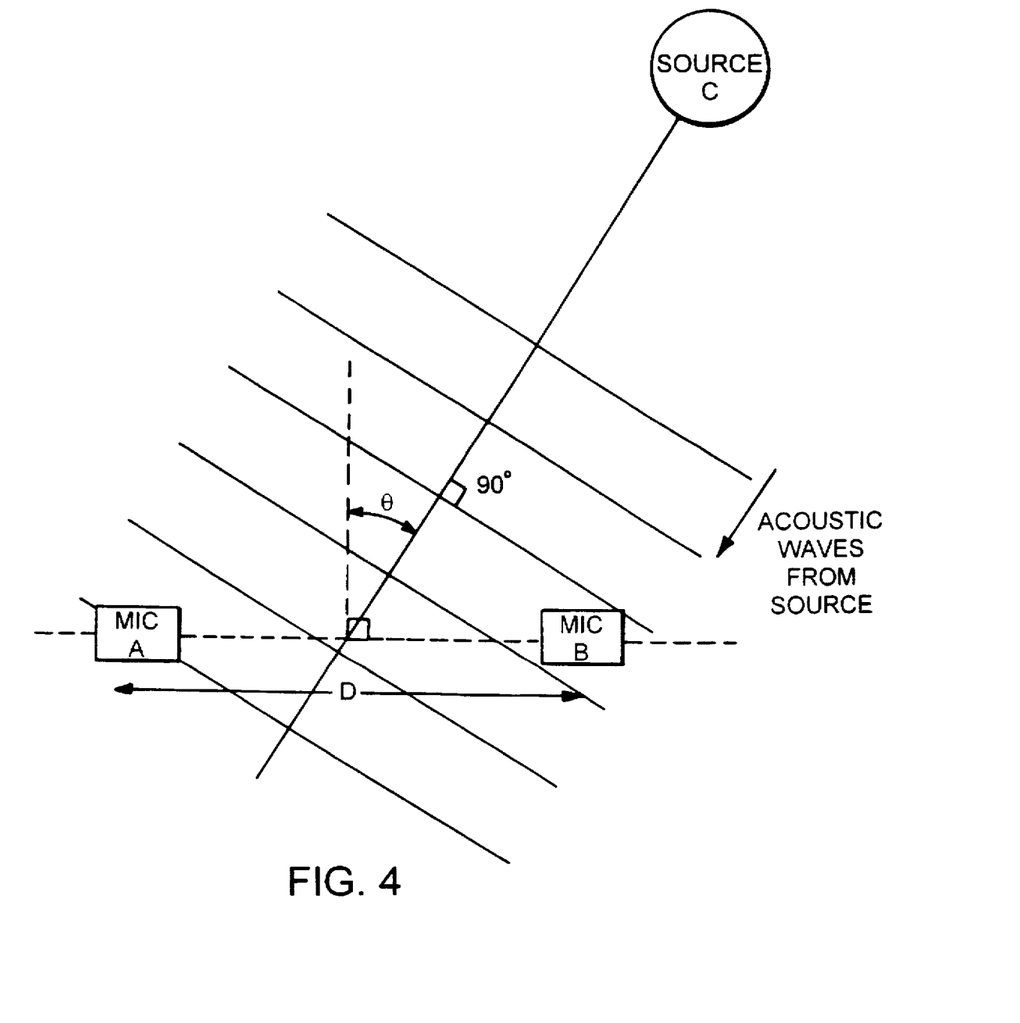
FIG. 4 illustrates the geometry of the bearing angle with respect to a pair of microphones receiving acoustic signals from a source.

Once the time delay signal t is generated, the bearing angle of the source 2 relative to the microphones 10, 11, may be determined by a direction or position locator 80 according to $$\theta = \text{acrsin}\left[\frac{v \times t}{D}\right] \quad [18]$$

where v is the velocity of sound, t is the time delay, and D is the distance between the microphones 10, 11. This method of estimating the direction of the acoustic source 2 is based upon a far field approximation wherein the acoustic signals are assumed to reach the microphones 10, 11 in the form of a flat or plane wave. FIG. 4 illustrates the geometry of the bearing angle $\theta$ with respect to two microphones A and B receiving acoustic signals from a source C, where the microphones A and B are separated by a distance D. If the assumption of plane waves is not appropriate for a particular application, then other techniques may be used for determining the direction or location of the source 2 with respect to the microphones 10, 11. Such techniques may include, for example, incorporating additional microphones into the system 1, and generating delays corresponding to the difference of arrival times of signals at the additional pairs of microphones according to the method described above. The multiple time delays may then be used, according to known techniques, to determine the direction or location of the source 2.

Figure 5:
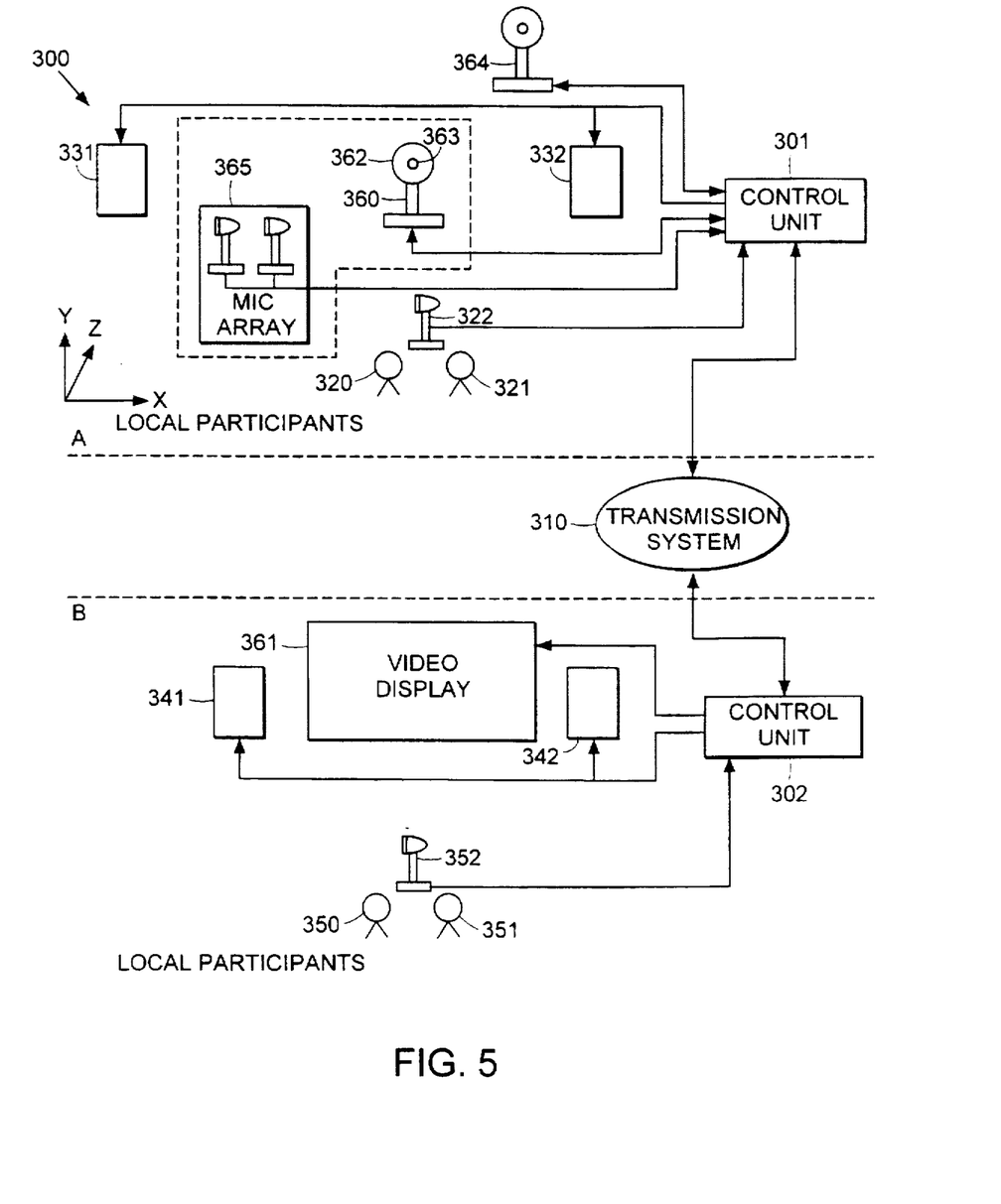
FIG. 5 illustrates a videoconferencing system according to the invention.

One preferred application of the present invention is in the context of a videoconferencing system, such as the system 300 illustrated in FIG. 5. The videoconferencing system 300 has two stations labelled A and B which are remotely located from one another. Participants 320, 321 at the station A are preferably in audio and video communication with the participants 350, 351 at the station B. A respective processor or control unit 301, 302 is provided at each station A and B to control the processing and transmission of the audio and video data via a transmission system 310. The transmission system 310 may include, for example, ISDN or T1 communication lines, for transmitting the audio and video signals.

To accomplish this communication, an audio system is provided for detecting sounds at each station, transmitting audio signals representative of those sounds between the stations via the transmission system 310, and reproducing the sound detected at each station in the other station. The audio system includes a microphone 322 and stereo loudspeakers 331, 332 at station A and a microphone 352 and loudspeakers 341, 342 at station B.

The videoconferencing system 300 also preferably includes two-way video communication between the participants at stations A and B. For ease of illustration, however, FIG. 5 shows video communication from station A to station B only. To accomplish video communication from station A to station B, station A further includes a video camera 360 which is controlled by a control unit 301 as explained further below. The video camera 360 includes a head portion 362 containing a camera lens 363 and generates signals representative of images at station A for transmission to station B. A microphone array 365, which includes at least two microphones, is associated with the video camera 360 and transmits acquired acoustic data to the control unit 301. The control unit 301 preferably includes the components of the system 1 shown within the dotted line of FIG. 1 for processing acoustic data received from the microphone array 365. Station B includes a video display 361 for displaying video signals received from station A.

Figure 6:
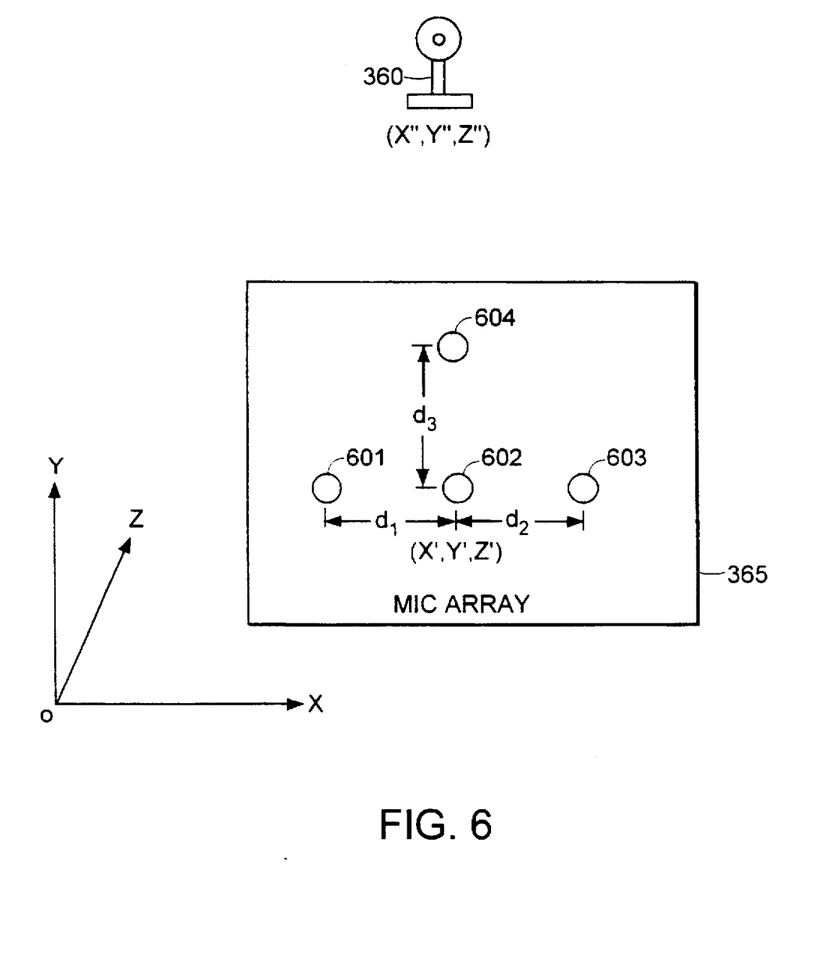
FIG. 6 illustrates an arrangement of microphones for use in a videoconferencing system in accordance with the invention.

One arrangement of the microphone array 365, is shown in FIG. 6 which includes four microphones 601, 602, 603, 604. Specifically, the microphone array 365 preferably includes three microphones 601, 602, 603 arranged linearly in the x-direction, for example, with a distance $d_1$ between the microphones 601, 602, and a distance $d_2$ between the microphones 602, 603. The fourth microphone 604 is preferably positioned a distance $d_3$ from the microphone 602 in the y-direction. Thus, assuming that the microphone 602 is positioned at (x', y', z'), the microphone 601 would be positioned at (x'-$d_1$, y', z'), the microphone 603 would be positioned at (x'+$d_2$, y', z') and the microphone 604 would be positioned at (x', y'+$d_3$, z'). The control unit 301 is preprogrammed with the known values $d_1$, $d_2$ and $d_3$, as well as the position (x", y", z") of the video camera 360 relative to the position of one of the microphones, such as the microphone 602, for example.

The operation of the videoconferencing system 300 of FIGS. 5 and 6 is as follows. When one of the participants at station A begins to speak, the acoustic signals generated by the participant's speech are acquired by the microphone 322, sent to the control unit 301 where they are processed in known fashion, and transmitted via the transmission system 310 to station B. At station B, the received acoustic signals are reproduced over the loudspeakers 341, 342.

The acoustic signals generated by the speaking participant are also acquired by the microphones 601–604 in the microphone array 365. The acquired signals are sent to the control unit 301 where signals from various pairs of the microphones 601–604 preferably are processed according to the method described above with respect to FIGS. 1–4. By determining the bearing angles corresponding to the delay in arrival times of acoustic signals at various pairs of the microphones 601–604, the direction of the speaking participant is determined. This information is then used to aim or adjust the direction of the camera 360 automatically.

For example, the acoustic data acquired at the microphones 601, 603 may be used to determine a bearing angle with respect to the x-axis. Once the bearing angle along the x-axis is determined, the control unit 301 automatically pans the camera head 362 in the direction of the speaking participant by using the bearing angle and the known relative position of the camera with respect to the microphones 601–604. Similarly, the acoustic data acquired at the microphones 602, 604 may be used to determine the bearing angle with respect to the y-axis. Once the bearing angle along the y-axis is determined, the control unit 301 automatically tilts the camera head 362 in the direction of the speaking participant by using the bearing angle and the known relative position of the camera with respect to the microphones 601–604. By appropriately panning and tilting the camera 360 in response to the calculated bearing angles, the speaking participant is automatically framed by the camera.

The microphone array arrangement of FIG. 6 may also be used, as described below, to determine the position of the speaking participant along the z-axis. The control unit 301 would then use the position of the speaking participant along the z-axis to zoom the camera lens 363 automatically so as to frame, for example, the head or upper body of the speaking participant.

A determination of the position of the speaking participant along the z-axis may be accomplished, for example, by determining two bearing angles with respect to one of the other axes, such as the x-axis. Again, the bearing angles are preferably determined according to the method described above with respect to FIGS. 1–4. For example, a first bearing angle corresponding to data acquired at the pair of microphones 601, 602 and a second bearing angle corresponding to data acquired at the pair of microphones 602, 603 would be determined. Once these two bearing angles are determined, the control unit 301 uses this information together with the known positions of the microphones 601, 602, 603 to determine the point of intersection between a line commencing from the mid-point of the microphones 601 and 602, using the first bearing angle, and a line commencing from the mid-point of the microphones 602 and 603, using the second bearing angle. The point of intersection represents the position of the speaking participant along the z-axis. The control unit 301 would then use this information to zoom the camera lens 363 automatically so as to frame the speaking participant.

In an alternative arrangement, the microphone array 365 includes only three microphones, such as the microphones 601, 602 and 604. In this implementation, acoustic data acquired at the microphones 601, 602 would be used to determine a bearing angle with respect to the x-axis. Similarly, acoustic data acquired at the microphones 602, 604 would be used to determine a bearing angle with respect to the y-axis. The bearing angles can then be used to pan, tilt or zoom the camera so as to appropriately frame the speaker. While this implementation uses only three microphones, the implementation described above using four microphones provides a symmetrical arrangement of the microphones.

In a preferred mode of operation, the image displayed at the display 361 is frozen during the transition period when the video camera 363 is panning or tilting. One advantage of freezing the displayed image in this manner is that it helps eliminate the blurry images that typically appear on the display 361 at station B as the camera pans or tilts.

Figure 7:
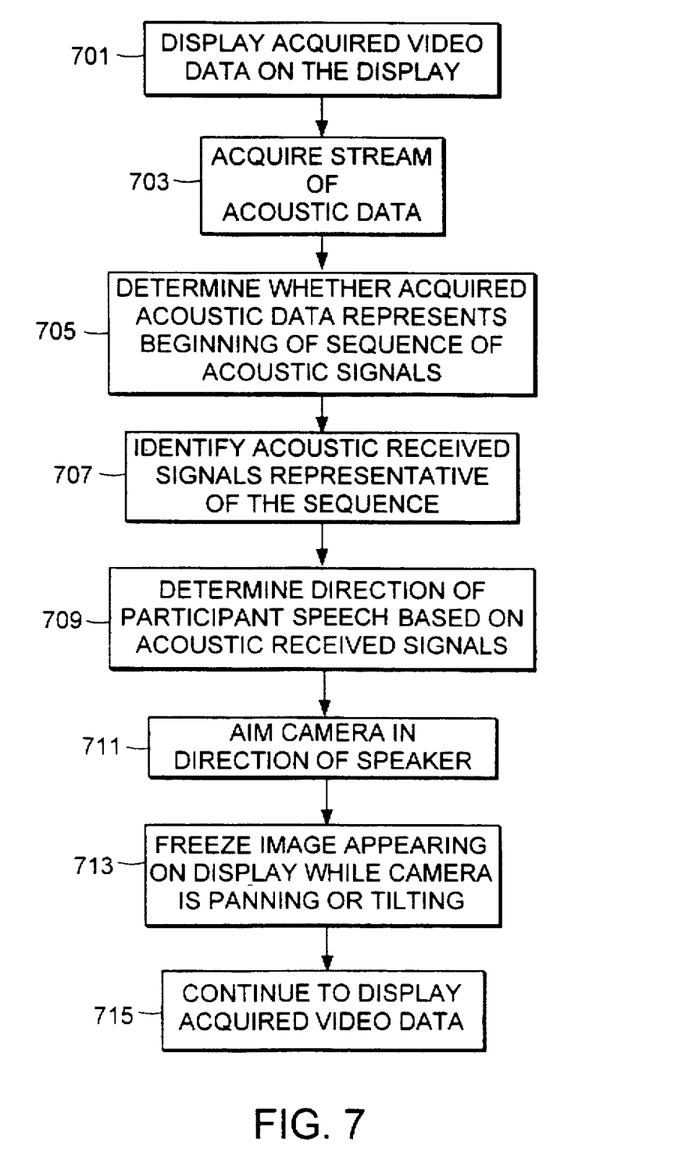
FIG. 7 is a flow chart showing steps of a method of aiming a video camera in the videoconferencing system.

FIG. 7 shows the steps of the mode of operation wherein the displayed image is frozen while the camera is panning or tilting. As the video camera 363 acquires video data which is transmitted to the station B, images corresponding to the acquired video data are displayed in substantially real time on the display 361, as indicated by step 701. Also, as the camera 363 continues to acquire video data, the array of microphones 365 acquires a stream of acoustic data during multiple time frames, as indicated by step 703. Preferably, as shown in step 705, the control unit 301 determines, in accordance with the method described above, whether the acoustic data acquired during a particular time frame represent the beginning of a sequence of acoustic signals from one of the participants 320, 321. The control unit 301 then would identify acoustic received signals representative of the sequence of signals if the data represents the beginning of the sequence, as indicated by step 707. Next, as shown by step 709, the control unit 301 determines the direction of the participant with respect to the video camera 363 based upon the acoustic received signals.

In response to the step 709 of determining the direction of the participant, the video camera 363 is automatically aimed in the direction of the participant by panning and/or tilting the camera 363 appropriately, as shown in step 711. According to this embodiment, however, when the video camera 363 is panning or tilting, a signal is sent to the control unit 301, for example, so as to freeze the image appearing on the display 361 at the frame occurring just prior to panning or tilting the camera. As indicated by step 713, the image is preferably frozen at the indicated frame until the video camera stops moving. In order to freeze the image, a frame store operation incorporated into the control unit 301 may be used. Alternatively, application specific hardware may be employed, or a video compression decoder can freeze the frame so as to reduce additional hardware costs. When the camera 363 is no longer panning or tilting, the images corresponding to new video data are again displayed on the display 361, as indicated by step 715.

In an alternative mode of operation, a second camera 364 is provided in the system 300 of FIG. 5. The control unit 301 would also store the relative position of the camera 364 with respect to the microphones 601–604. The camera 360, for example, can be used to follow individual speakers by panning and tilting appropriately, whereas the camera 364 can be used to frame a group of participants at station A. When the system 300 is causing the active camera 360 to pan or tilt, the system 300 switches to the camera 364. Participants 350, 351 at station B would thus see the images from the camera 364 during the period when the camera 360 is moving. Once the camera 360 stops moving, in other words, once the panning and tilting functions are completed, the system 300 would switch back to the active camera 360. In yet another mode of operation, the camera 364 can also be used to follow individual speakers by panning and tilting appropriately. The cameras 360, 364 would be controlled so that only one of the cameras 360, 364 is moving at any given time. The system 300 would then continuously switch between the cameras 360, 364 so that the video output of the stationary camera would be sent to the display 361 at station B. Such modes, employing more than one camera, may achieve sharp, non-blurring transitions without frame freezing.

Although the invention has been described with respect to specific implementations, it is to be understood that variations and modifications within the spirit and scope of the invention are contemplated.

What is claimed is:

1. A method of processing a sequence of acoustic signals arriving from an acoustic source comprising the steps of:

acquiring respective streams of acoustic data at a plurality of locations during a plurality of time frames;

determining whether the acoustic data acquired at any one of the locations during a particular time frame represents the beginning of the sequence of acoustic signals;

identifying acoustic received signals at at least two of said locations representative of said sequence of signals if said acoustic data at any one of said locations represents the beginning of the sequence; and determining a direction of said source based upon the identified acoustic received signals.

2. The method of claim 1 wherein the step of determining whether the signals acquired during a particular time frame represent the beginning of the sequence of acoustic signals comprises the step of examining the magnitude of a plurality of frequency components of signals acquired during the particular time frame.

3. The method of claim 2 wherein the step of examining comprises the steps of:

determining, for a plurality of frequencies, whether the magnitude of each such frequency component of signals acquired during the particular time frame is greater than a background noise energy for that frequency by at least a first predetermined amount; and determining, for the plurality of frequencies, whether the magnitude of each such frequency component is greater than the magnitude of corresponding frequency components of signals acquired during a pre-specified number of preceding time frames by at least a second predetermined amount.

4. The method of claim 3 wherein the step of identifying comprises the steps of:

identifying signals representative of cross-correlations between signals acquired at the plurality of locations during the particular time frame; and subtracting a corresponding background noise from each of the signals representative of the cross-correlations.

5. The method of claim 3 wherein the step of identifying comprises determining, for the plurality of frequencies, whether the magnitude of each such frequency component of the signals acquired during the particular time frame is at least a first predetermined number of times greater than the background noise energy for that frequency.

6. The method of claim 3 wherein the step of identifying comprises determining, for the plurality of frequencies, whether the magnitude of each such frequency component of the signals acquired during the particular time frame is at least a second predetermined number of times greater than the magnitude of corresponding frequency components of signals acquired during a pre-specified number of preceding time frames.

7. The method of claim 4 wherein the step of determining the direction of the source comprises the step of extracting from the acoustic acquired signals a time delay indicative of the difference in arrival times of the sequence of acoustic signals at the plurality of microphone locations.

8. The method of claim 7 further comprising the steps of extracting from the acoustic received signals a plurality of potential time delays each of which falls within one of a plurality of ranges of values, and selecting an actual time delay based upon the number of potential time delays falling within each range and a relative weight assigned to each range.

9. The method of claim 8 wherein ranges of potential time delays having relatively small values are assigned higher relative weights than ranges of potential time delays having larger values.

10. A method of processing a sequence of acoustic signals arriving from an acoustic source for use in videoconferencing comprising the steps of:

acquiring a stream of acoustic data during a plurality of time frames;

determining whether the acoustic data acquired during a particular time frame represent the beginning of the sequence of acoustic signals;

identifying acoustic received signals representative of said sequence of signals when said data represents the beginning of the sequence;

determining the direction of said source based upon the acoustic received signals; and aiming a video camera automatically in response to the step of determining the direction of said source.

11. The method of claim 10 wherein the step of determining whether the acoustic data acquired during a particular time frame represent the beginning of the sequence of acoustic signals comprises the steps of:

determining, for a plurality of frequencies, whether the magnitude of each such frequency component of signals acquired during the particular time frame is greater than a background noise energy for that frequency by at least a first predetermined amount; and determining, for the plurality of frequencies, whether the magnitude of each such frequency component is greater than the magnitude of corresponding frequency components of signals acquired during a pre-specified number of preceding time frames by at least a second predetermined amount.

12. The method of claim 11 wherein the step of aiming comprises the step of panning the camera in the direction of said source.

13. The method of claim 11 wherein the step of aiming comprises the step of tilting the camera in the direction of said source.

14. The method of claim 11 further comprising the step of determining the location of the source based upon the acoustic received signals.

15. The method of claim 14 further comprising the step of automatically zooming a lens of the camera so as to frame the source in response to the step of determining the location of the source.

16. An apparatus for processing a sequence of acoustic signals arriving from an acoustic source comprising:

a plurality of transducers for acquiring a stream of acoustic data during a plurality of time frames;

means for determining whether the acoustic data acquired at any one of the transducers during a particular time frame represents the beginning of the sequence of acoustic signals;

means for identifying acoustic received signals at at least two of said locations representative of said sequence of signals if said acoustic data at any one of said locations represents the beginning of the sequence; and means for determining a direction of said source based upon the identified acoustic received signals.

17. The apparatus of claim 16 wherein the means for determining whether the acquired acoustic data acquired represent the beginning of the sequence of acoustic signals comprises:

a background noise energy estimator;

a first means for determining, for a plurality of frequencies, whether the magnitude of each such frequency component of signals acquired during the particular time frame is greater than a background noise energy for that frequency by at least a first predetermined amount;

a second means for determining, for the plurality of frequencies, whether the magnitude of each such frequency component is greater than the magnitude of corresponding frequency components of signals acquired during a pre-specified number of preceding time frames by at least a second predetermined amount.

18. The apparatus of claim 17 wherein the means for identifying comprises means for determining, for the plurality of frequencies, whether the magnitude of each such frequency component of the signals acquired during the particular time frame is at least a first predetermined number of times greater than the background noise energy for that frequency.

19. The apparatus of claim 17 wherein the means for identifying comprises means for determining, for the plurality of frequencies, whether the magnitude of each such frequency component of the signals acquired during the particular time frame is at least a second predetermined number of times greater than the magnitude of corresponding frequency components of signals acquired during a pre-specified number of preceding time frames.

20. The apparatus of claim 17 wherein the means for identifying comprises:

means for identifying signals representative of cross-correlations between signals acquired at the plurality of transducers during the particular time frame; and a differencer for subtracting a corresponding background noise from each of the signals representative of the cross-correlations.

21. The apparatus of claim 20 wherein the means for determining the direction of the source comprises means for extracting from the acoustic acquired signals a time delay indicative of the difference in arrival times of the sequence of acoustic signals at the plurality of microphone locations.

22. The apparatus of claim 21 further comprising means for extracting from the acoustic received signals a plurality of potential time delays each of which falls within one of a plurality of ranges of values, and means for selecting an actual time delay based upon the number of potential time delays falling within each range and a relative weight assigned to each range.

23. The apparatus of claim 22 wherein ranges of potential time delays having relatively small values are assigned higher relative weights than ranges of potential time delays having larger values.

24. An apparatus for processing a sequence of acoustic signals arriving from an acoustic source for use in video-conferencing comprising:

a video camera;

a plurality of transducers for acquiring a stream of acoustic data during a plurality of time frames;

means for determining whether the acoustic data acquired during a particular time frame represent the beginning of the sequence of acoustic signals;

means for identifying acoustic received signals representative of said sequence of signals when said data represents the beginning of the sequence; and means for determining the direction of said source based upon the acoustic received signals;

wherein the video camera is automatically aimed in the direction of the source in response to signals received from the means for determining the direction of said source.

25. The apparatus of claim 24 wherein the means for determining whether the acquired acoustic data acquired represent the beginning of the sequence of acoustic signals comprises:

a background noise energy estimator;

a first means for determining, for a plurality of frequencies, whether the magnitude of each such frequency component of signals acquired during the particular time frame is greater than a background noise energy for that frequency by at least a first predetermined amount; and a second means for determining, for the plurality of frequencies, whether the magnitude of each such frequency component is greater than the magnitude of corresponding frequency components of signals acquired during a pre-specified number of preceding time frames by at least a second predetermined amount.

26. The apparatus of claim 25 wherein the camera is automatically panned in the direction of the source in response to the signals received from the means for determining the direction of said source.

27. The apparatus of claim 25 wherein the camera is automatically tilted in the direction of the source in response to the signals received from the means for determining the direction of said source.

28. An apparatus for processing a sequence of acoustic signals arriving from an acoustic source for use in videoconferencing comprising:

a video camera;

at least a first, second and third transducer for acquiring a stream of acoustic data during a plurality of time frames;

means for determining whether the acoustic data acquired during a particular time frame represent the beginning of the sequence of acoustic signals;

means for identifying acoustic received signals representative of said sequence of signals when said data represents the beginning of the sequence; and means for determining the direction of said source in two-dimensions based upon the acoustic received signals;

wherein the video camera is automatically aimed in the direction of the source in response to signals received from the means for determining the direction of said source.

29. The apparatus of claim 28 wherein the means for determining whether the acquired acoustic data acquired represent the beginning of the sequence of acoustic signals comprises:

a background noise energy estimator;

a first means for determining, for a plurality of frequencies, whether the magnitude of each such frequency component of signals acquired during the particular time frame is greater than a background noise energy for that frequency by at least a first predetermined amount; and a second means for determining, for the plurality of frequencies, whether the magnitude of each such frequency component is greater than the magnitude of corresponding frequency components of signals acquired during a pre-specified number of preceding time frames by at least a second predetermined amount.

30. The apparatus of claim 28 wherein the first transducer is displaced from the second transducer along a first axis and the third transducer is displaced from the second transducer along a second axis perpendicular to the first axis;

acoustic data acquired by the first and second transducers is used to determine the direction of the source with respect to the first axis, and acoustic data acquired by the second and third transducers is used to determine the direction of the source with respect to the second axis; and the video camera is automatically panned and tilted in the direction of the source in response to the signals received from the means for determining the direction of said source.

31. The apparatus of claim 28 further comprising a fourth transducer for acquiring a stream of acoustic data during the plurality of time frames, wherein the first, second and third transducers are located along a first axis, with the second transducer located between the first and third transducers, and the fourth transducer is displaced from the second transducer along a second axis perpendicular to the first axis;

acoustic data acquired by the first and third transducers is used to determine the direction of the source with respect to the first axis, and acoustic data acquired by the second and fourth transducers is used to determine the direction of the source with respect to the second axis; and the video camera is automatically panned and tilted in the direction of the source in response to the signals received from the means for determining the direction of said source.

32. The apparatus of claim 31 further comprising:

means for determining the position of the source, wherein acoustic data acquired by three of the four transducers is used to determine the position of the source; and wherein the camera automatically is zoomed so as to frame the source in response to signals received from the means for determining the position of the source.

33. A method of processing a sequence of acoustic signals arriving from an acoustic source for use in videoconferencing comprising the steps of:

acquiring a stream of acoustic data during a plurality of time frames at first, second and third transducers;

determining whether the acoustic data acquired during a particular time frame represent the beginning of the sequence of acoustic signals;

identifying acoustic received signals representative of said sequence of signals when said data represents the beginning of the sequence;

determining the direction of said source in two-dimensions based upon the acoustic received signals; and aiming a video camera automatically in the direction of the source in response to the step of determining the direction of said source.

34. The method of claim 33 further comprising the step of:

acquiring a stream of acoustic data during the plurality of time frames at a fourth transducer;

determining the position of the source in a third dimension, wherein acoustic data acquired by three of the four transducers is used to determine the position of the source; and zooming the video camera automatically so as to frame the source in response to the step of determining the position of the source.

35. A method of operating a video camera for use in videoconferencing comprising the steps of:

displaying images corresponding to video data acquired by the video camera;

acquiring a stream of acoustic data, including a sequence of acoustic signals from a source, during a plurality of time frames;

determining the direction of said source based upon the acquired stream of acoustic data;

aiming the video camera automatically in response to the step of determining by tilting or panning the video camera; and freezing the image displayed on a display during the period when the video camera is tilting or panning.

36. The method of claim 35 wherein the step of freezing comprises the step of freezing the image appearing on the display at a video frame occurring just prior to panning or tilting the video camera.

37. A method of operating a system comprising at least first and second video cameras for use in videoconferencing comprising, the method comprising:

displaying on a display images corresponding to video data acquired by the first video camera;

acquiring a stream of acoustic data, including a sequence of acoustic signals from a source, during a plurality of time frames;

determining whether the acoustic data acquired during a particular time frame represent the beginning of the sequence of acoustic signals;

identifying acoustic received signals representative of said sequence of signals when said data represents the beginning of the sequence; and determining the direction of said source based upon the acoustic received signals;

aiming the first video camera automatically in response to determining the direction by tilting or panning the video camera; and displaying on the display images corresponding to video data acquired by the second video camera during the period when the first video camera is tilting or panning.

* * * * *